(12) United States Patent
Naito (10) Patent No.: US 10,785,390 B2
(45) Date of Patent: Sep. 22, 2020

(54) IMAGING DEVICE, IMAGING SYSTEM, MOVABLE OBJECT, METHOD, AND PROGRAM

(71) Applicant: SZ DJI TECHNOLOGY CO., LTD., Shenzhen (CN)

(72) Inventor: Kiichi Naito, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 12 days.

(21) Appl. No.: 16/295,097

(22) Filed: Mar. 7, 2019

(65) Prior Publication Data
US 2019/0208098 A1  Jul. 4, 2019

Related U.S. Application Data (63) Continuation of application No. PCT/JP2016/076533, filed on Sep. 8, 2016.

(51) Int. Cl.
*H04N 5/225* (2006.01)
*B64D 47/08* (2006.01)
(Continued)

(52) U.S. Cl.
CPC ......... *H04N 5/22521* (2018.08); *B64C 39/02* (2013.01); *B64C 39/024* (2013.01);
(Continued)

(58) Field of Classification Search
CPC .............. H04N 1/00909; H04N 1/4097; H04N 5/2171; H04N 5/2251; H04N 5/22521
See application file for complete search history.

(56) References Cited

U.S. PATENT DOCUMENTS

2003/0202114 A1* 10/2003 Takizawa ............... G03B 17/02
                                                      348/335
2003/0214599 A1* 11/2003 Ito ....................... G02B 27/0006
                                                      348/335
(Continued)

FOREIGN PATENT DOCUMENTS

JP        200456368 A       2/2004
JP         3727903 B2      12/2005
(Continued)

OTHER PUBLICATIONS

World Intellectual Property Organization (WIPO) International Search Report for PCT/JP2016/076533 dated Nov. 29, 2016 5 Pages.

*Primary Examiner* — Twyler L Haskins
*Assistant Examiner* — Dwight Alex C Tejano
(74) *Attorney, Agent, or Firm* — Anova Law Group, PLLC (57) ABSTRACT

An imaging device includes an image sensor, an optical element arranged in front of the image sensor, an electromechanical converter attached to the optical element, and a controller configured to provide a control signal to the electromechanical converter to control a vibration of the electromechanical converter. An amplitude of the control signal has a first amplitude value when a frequency of the control signal has a first frequency value. The amplitude of the control signal has a second amplitude value smaller than the first amplitude value when the frequency of the control signal has a second frequency value that is closer to a resonant frequency of the optical member than the first frequency value.

20 Claims, 9 Drawing Sheets

(51) Int. Cl.
   *G03B 17/02*      (2006.01)
   *B64C 39/02*      (2006.01)
   *H04N 5/232*      (2006.01)
   *G02B 27/00*      (2006.01)
(52) U.S. Cl.
   CPC ......... *B64D 47/08* (2013.01); *G02B 27/0006* (2013.01); *G03B 17/02* (2013.01); *H04N 5/2254* (2013.01); *H04N 5/23248* (2013.01)

(56) References Cited

U.S. PATENT DOCUMENTS

| | | | |
|---|---|---|---|
| 2004/0047625 A1* | 3/2004 | Ito | G03B 19/12 396/429 |
| 2008/0297651 A1* | 12/2008 | Urakami | H04N 5/217 348/374 |
| 2009/0002541 A1* | 1/2009 | Niwamae | G03B 17/02 348/335 |
| 2009/0015705 A1* | 1/2009 | Urakami | G02B 27/0006 348/340 |
| 2009/0206698 A1* | 8/2009 | Okazaki | G03B 17/00 310/317 |
| 2011/0121686 A1* | 5/2011 | Sumioka | H02N 2/142 310/317 |

FOREIGN PATENT DOCUMENTS

| | | |
|---|---|---|
| JP | 2006259162 A | 9/2006 |
| JP | 3917893 B2 | 5/2007 |
| JP | 3947689 B2 | 7/2007 |
| JP | 4002785 B2 | 11/2007 |
| JP | 4039904 B2 | 1/2008 |
| JP | 4253523 B2 | 4/2009 |
| JP | 201098410 A | 4/2010 |
| JP | 4617277 B2 | 1/2011 |
| JP | 4660575 B2 | 3/2011 |
| JP | 4857195 B2 | 1/2012 |
| JP | 4859216 B2 | 1/2012 |
| JP | 4863440 B2 | 1/2012 |
| JP | 4936518 B2 | 5/2012 |
| JP | 5004819 B2 | 8/2012 |
| JP | 5094628 B2 | 12/2012 |
| JP | 5111219 B2 | 1/2013 |
| JP | 5264302 B2 | 8/2013 |
| JP | 2015212820 A | 11/2015 |
| JP | 2016025571 A | 2/2016 |

* cited by examiner

IMAGING DEVICE, IMAGING SYSTEM, MOVABLE OBJECT, METHOD, AND PROGRAM

CROSS-REFERENCE TO RELATED APPLICATION

This application is a continuation of International Application No. PCT/JP2016/076533, filed on Sep. 8, 2016, the entire contents of which are incorporated herein by reference.

FIELD

The disclosure relates to methods and programs for an imaging device, imaging system, and movable object.

BACKGROUND

Various techniques have been proposed in which dust or the like adhering to an optical member is removed by oscillating the optical member disposed on the front of an image sensor provided in an imaging device. Japanese Patent No. 3727903 discloses a technique that sequentially vibrates an optical element near at least two or more resonant frequencies.

Patent Document 1: Japanese Patent No. 3727903
Patent Document 2: Japanese Patent No. 4253523
Patent Document 3: Japanese Patent No. 5004819
Patent Document 4: Japanese Patent No. 3917893
Patent Document 5: Japanese Patent No. 3947689
Patent Document 6: Japanese Patent No. 4002785
Patent Document 7: Japanese Patent No. 4039904
Patent Document 8: Japanese Patent No. 4863440
Patent Document 9: Japanese Patent No. 4660575
Patent Document 10: Japanese Patent No. 4936518
Patent Document 11: Japanese Patent No. 4617277
Patent Document 12: Japanese Patent No. 4859216
Patent Document 13: Japanese Patent No. 4857195
Patent Document 14: Japanese Patent No. 5111219
Patent Document 15: Japanese Patent No. 5264302
Patent Document 16: Japanese Patent No. 5094628
Patent Document 17: Japanese Unexamined Patent Application Publication No. 2014-149907

SUMMARY

The vibration amplitude of the optical element fluctuates according to the size of the vibration frequency applied to the optical element. Due to the fluctuation in the vibration amplitude of the optical element, the optical element cannot sufficiently vibrate and thus may not adequately remove the dust or the like.

An imaging device according to one aspect of the present disclosure can include an image sensor. The imaging device can further include an optical member disposed on a front of the image sensor. The imaging device can further include an electromechanical conversion element attached to the optical member. The imaging device can further include a control unit. The control unit can provide a control signal to the electromechanical conversion element, thereby controlling a vibration of the electromechanical conversion element. The control unit can provide the control signal to the electromechanical conversion element with a voltage amplitude of a first size when a voltage frequency is a first frequency. The control unit can provide the control signal to the electromechanical conversion element with a voltage amplitude of a second size, when the voltage frequency is a second frequency closer to a resonant frequency of the optical member than the first frequency. The second size is smaller than the first size.

The control unit can provide the control signal, in which the voltage amplitude becomes larger as the frequency of the voltage moves away from the second frequency, to the electromechanical conversion element. The second frequency can be the resonant frequency of the optical member.

The control unit can provide the control signal to the electromechanical conversion element, in which the voltage amplitude gradually changes from the first size to the second size in response to the frequency of the voltage gradually changing from the first frequency to the second frequency.

The first frequency can be smaller than the second frequency, and the second frequency can be the resonant frequency. The control unit can provide the control signal to the electromechanical conversion element after the voltage amplitude gradually changes from the first size to the second size. The control signal is provided in response to the frequency of the voltage gradually changing from the first frequency to the second frequency. The voltage amplitude gradually changes from the second size to a third size that is larger than the second size in response to the frequency of the voltage gradually changing from the second frequency to a third frequency that is larger than the second frequency.

The control unit can provide the control signal to the electromechanical conversion element after the voltage amplitude gradually changes from the second size to the third size. The control signal is provided in response to the frequency of the voltage gradually changing from the second frequency to the third frequency. The voltage amplitude gradually changes from the third size to the second size in response to the frequency of the voltage gradually changing from the third frequency to the second frequency. Additionally, the voltage amplitude gradually changes from the second size to the first size in response to the frequency of the voltage gradually changing from the second frequency to the first frequency.

The control unit can repeatedly provide the control signal to the electromechanical conversion element a predetermined number of times.

The control unit can provide the control signal to the electromechanical conversion element, in which the frequency of the voltage and a size of the voltage amplitude gradually change when a predetermined amount of time elapses.

The control unit can provide the control signal to the electromechanical conversion element, in which the frequency of the voltage gradually changes by a predetermined frequency and a size of the voltage amplitude gradually changes by a predetermined size.

An imaging system according to an aspect of the present disclosure can include the imaging device. The imaging system can further include a carrier that supports the imaging device.

A movable object according to an aspect of the present disclosure can move and can include the imaging system. The movable object can be an unmanned aerial vehicle.

The imaging system can further include a handle that is attached to the carrier.

A method according to one aspect of the present disclosure can control a vibration of an electromechanical conversion element attached to an optical member disposed on a front of an image sensor by providing a control signal to the electromechanical conversion element. The method can include providing the control signal to the electromechanical conversion element with a voltage amplitude of a first size when a frequency of the voltage is a first frequency. The method can include providing the control signal to the electromechanical conversion element with the voltage amplitude of a second size that is smaller than the first size when the frequency of the voltage is of a second frequency that is closer to a resonant frequency of the optical member than the first frequency.

A program according to one aspect of the present disclosure can cause a computer to function as a control unit that controls a vibration of an electromechanical conversion element attached to an optical member disposed on a front of an image sensor by providing a control signal to the electromechanical conversion element. The program can cause the computer to provide the control signal to the electromechanical conversion element with a voltage amplitude of a first size when a frequency of the voltage is a first frequency. The program can cause the computer to provide the control signal to the electromechanical conversion element with a voltage amplitude of a second size that is smaller than the first size when the frequency of the voltage is of a second frequency that is closer to a resonant frequency of the optical member than the first frequency.

It is possible to prevent the optical element from insufficiently oscillating and dust or the like from being insufficiently removed due to fluctuations in the vibration amplitude of the optical element.

The features described above can also be arranged into a variety of subcombinations.

DETAILED DESCRIPTION OF THE EMBODIMENTS

The present disclosure is described below using some embodiments of the disclosure, but the embodiments below do not limit the disclosure. Combinations of features described in the embodiments below are not all the combinations of features of the disclosure.

The scope of the claims, specification, drawings, and abstract include matters subject to protection by copyright. The owner of copyright does not raise objections to duplication by any person of these documents if it is as displayed in the files or records of the Patent Office. However, in all other cases, all copyrights are reserved.

The various embodiments of the present disclosure can be described by referring to the flowcharts and block diagrams. These blocks can represent: 1) steps in a process in which operations are executed; or 2) "units" of a device that has a function of executing an operation. Specific steps and "units" can be implemented via a programmable circuit and/or a processor. A dedicated circuit can include a digital and/or analog hardware circuit. The dedicated circuit also can include an integrated circuit (IC) and/or a discrete circuit. The programmable circuit can include a reconfigurable hardware circuit. The reconfigurable hardware circuit can include: a logic AND, a logic OR, a logic XOR, a logic NAND, a logic NOR, or other type of logic operation, and a memory element such as a flip-flop, a register, a field programmable gate array (FPGA), a programmable logic array (PLA), or the like.

A computer readable medium can include any tangible device that can store instructions to be executed by an appropriate device. As a result, a computer-readable medium having instructions stored thereon can include a manufactured good that includes instructions that can be executed to create means for executing operations designated in a flowchart or a block diagram. As for examples of computer-readable media, electronic recording media, magnetic recording media, optical recording media, electromagnetic recording media, semiconductor recording media, and the like can be included. As for more specific examples of computer-readable media, floppy Discs®, diskettes, hard discs, random access memory (RAM), read-only memory (ROM), erasable programmable read-only memory (EPROM or flash memory), electrically erasable programmable read-only memory (EEPROM), static random access memory (SRAM), compact disc read-only memory (CD-ROM), digital versatile disc (DVD), Blu-ray® discs, memory sticks, integrated circuit cards, and the like can be included.

Computer readable instructions can include either source code or object code written in any combination of one or more of programming languages. The source code or object code can include a conventional procedural programming language. The conventional procedural programming language can be assembler instructions; instruction set architecture (ISA) instructions; machine instructions; machine-dependent instructions; microcode; firmware instructions; state setting data; an object-oriented programming language such as Smalltalk, JAVA®, C++, or the like; "C" programming language; or a similar programming language. The computer readable instructions can be provided to a processor or programmable circuit of a general-purpose computer, a special-purpose computer, or another programmable data processing device either locally or via a local area network (LAN) or a wide area network (WAN) such as the Internet. The processor or programmable circuit can execute computer readable instructions in order to create means for executing the operations designated in a flowchart or block diagram. Examples of a processor can include a computer processor, a processing unit, a microprocessor, a digital signal processor, a controller, a microcontroller, and the like.

Figure 1:
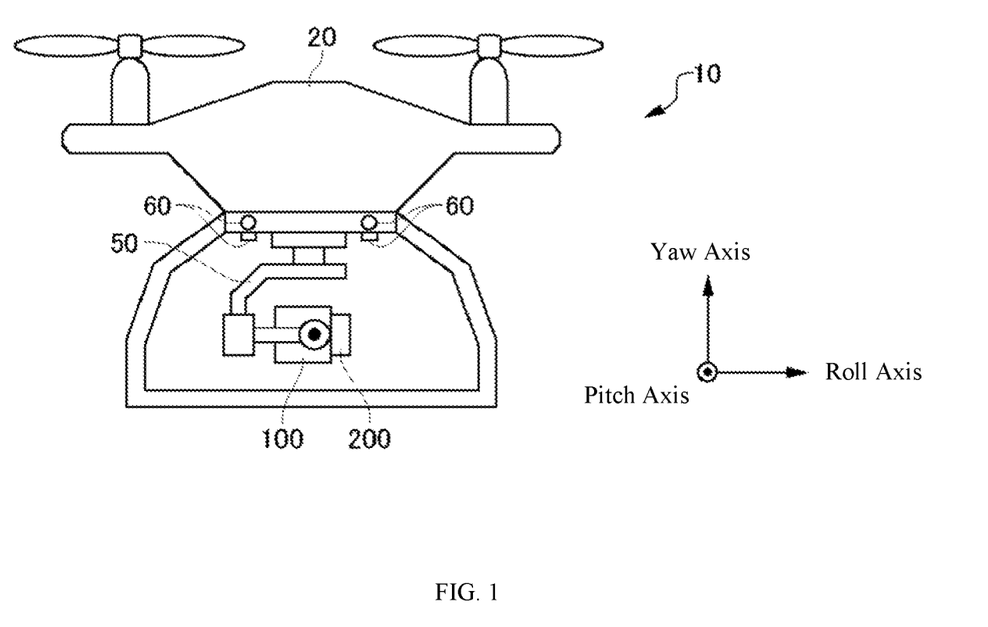
FIG. 1 is a diagram illustrating one example of an exterior of an unmanned aerial vehicle (UAV).

FIG. 1 illustrates one example of an exterior of an unmanned aerial vehicle (UAV) 10. The UAV 10 can include: a UAV body 20; a gimbal 50; a plurality of imaging devices 60; an imaging device 100; and a lens device 200. The UAV 10 is an example of a movable object that is driven by a propulsion unit. A movable object can be a concept that includes, in addition to UAVs, other aerial vehicles moving in the air, vehicles moving on the ground, ships moving in the water, and the like.

The UAV body 20 can include a plurality of rotary wings. The plurality of rotary wings are an example of a propulsion unit. The UAV body 20 can cause the UAV 10 to fly by controlling the rotation of the plurality of rotary wings. The UAV body 20 can cause the UAV 10 to fly by using four rotary wings, for example. The number of rotary wings is not limited to four. In addition, the UAV 10 can be a fixed-wing aircraft that does not have rotary wings.

The imaging device 100 can be an imaging camera that captures images of a subject contained in a desired imaging range. The gimbal 50 can rotatably support the imaging device 100 and the lens device 200. The gimbal 50 is an example of a carrier. The gimbal 50 can rotatably support the imaging device 100 and the lens device 200 along the pitch axis, for example. The gimbal 50 can also rotatably support the imaging device 100 and the lens device 200 along the roll axis and the yaw axis, respectively. The gimbal 50 can support the imaging device 100 and can support the lens device 200. The imaging device 100 can contain the lens device 200. The gimbal 50 can modify the imaging direction of the imaging device 100 by causing the imaging device 100 and the lens device 200 to rotate about at least one of the yaw axis, the pitch axis, and the roll axis.

The imaging device 100 can generate and record image data of optical images formed via the lens device 200. The lens device 200 can be integrally provided with the imaging device 100. The lens device 200 can be a so-called "interchangeable lens," and can be detachably provided on the imaging device 100.

The plurality of imaging devices 60 are sensing cameras that take images of the surroundings of the UAV 10 in order to control the flight of the UAV 10. Two imaging devices 60 can be provided on the front surface, which is the nose of the UAV 10. In addition, two other imaging devices 60 can be provided on the bottom surface of the UAV 10. The two imaging devices 60 on the front surface form a pair, and can function as a so-called "stereo camera." The two imaging devices 60 on the bottom surface form a pair, and can function as a stereo camera. Three-dimensional spatial data of the surroundings of the UAV 10 can be generated in accordance with the images captured by the plurality of imaging devices 60. The number of imaging devices 60 included in the UAV 10 is not limited to four. The UAV 10 needs to include at least one imaging device 60. The UAV 10 can include at least one imaging device 60 on each of the following parts of the UAV 10: the neck, the tail, the sides, the lower surface, and the upper surface. The angle of view that can be set via the imaging device 60 can be larger than the angle of view that can be set via the imaging device 100. The imaging device 60 can have a prime lens or a fisheye lens.

Figure 2:
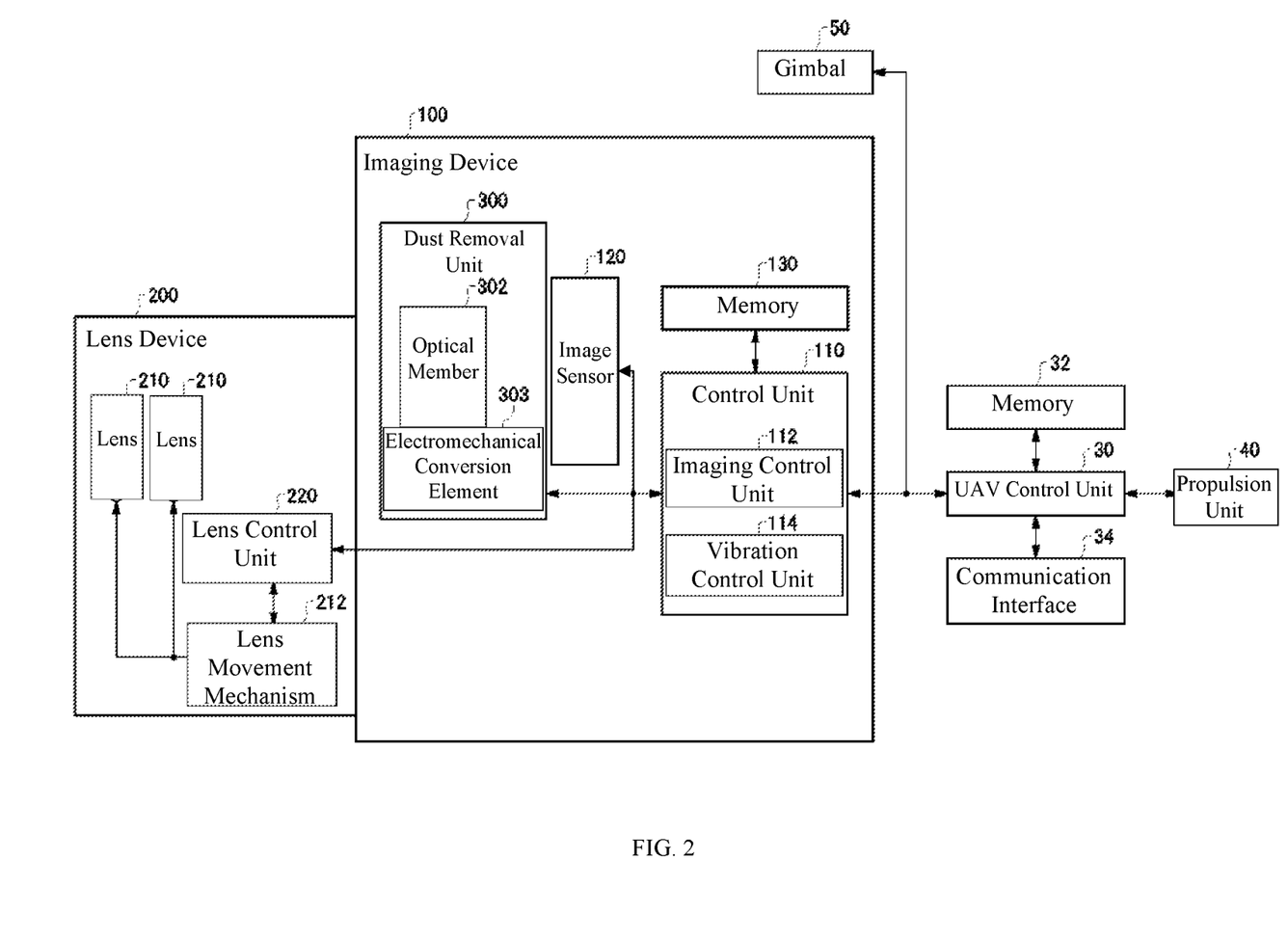
FIG. 2 is a diagram illustrating one example of a functional block of the UAV.

FIG. 2 illustrates one example of a functional block of the UAV 10. The UAV 10 can include: a UAV control unit 30 (UAV controller); memory 32; a communication interface 34; a propulsion unit 40 (propulsor); the gimbal 50; the imaging devices 60; the imaging device 100; and the lens device 200.

The communication interface 34 can communication with an external transmitter. The communication interface 34 can receive various types of instructions for the UAV control unit 30 from the remote transmitter. The memory 32 can store programs and the like necessary for the UAV control unit 30 to control the propulsion unit 40, the gimbal 50, the imaging devices 60, the imaging device 100, and the lens device 200. The memory 32 can be a computer readable recording medium and can include at least one of: SRAM; DRAM; EPROM; EEPROM; and flash memory such as USB memory. The memory 32 can be provided within the UAV body 20. The memory 32 can be provided so as to be removable from the UAV body 20.

The UAV control unit 30 can control the flight and imaging of the UAV 10 based on the programs stored in the memory 32. The UAV control unit 30 can be configured from a microprocessor such as a CPU or MPU, a microcontroller such as an MCU, or the like. The UAV control unit 30 can control the flight and imaging of the UAV 10 based on instructions received from the remote transmitter via the communication interface 34. The propulsion unit 40 can propel the UAV 10. The propulsion unit 40 can have a plurality of rotary wings, and a plurality of drive motors that cause the plurality of rotary wings to rotate. The propulsion unit 40 can cause the plurality of rotary wings to rotate via the plurality of drive motors based on instructions from the UAV control unit 30, thereby causing the UAV 10 to fly.

The lens device 200 can include: a plurality of lenses 210; a lens movement mechanism 212; and a lens control unit 220 (lens controller). The plurality of lenses 210 can function as zoom lenses, varifocal lenses, or focus lenses. At least a portion or all of the plurality of lenses 210 can be disposed so as to be able to move along the optical axis. The plurality of lenses 210 can be interchangeable lenses provided so as to be detachable from the lens device 200. The lens movement mechanism 212 can cause at least a portion or all of the plurality of lenses 210 to move along the optical axis. The lens control unit 220 can drive the lens movement mechanism 212 based on lens control instructions from the imaging device 100, thereby causing one or more of the lenses 210 to move along the optical axis. The lens control instructions can be zoom control instructions and focus control instructions, for example.

The imaging device 100 can include: an image sensor 120; a control unit 110 (controller); memory 130; and a dust removal unit 300 (dust remover). The control unit 110 can have an imaging control unit 112 (imaging controller) and a vibration control unit 114 (vibration controller). The imaging control unit 112 can control imaging by the imaging device 100. The vibration control unit 114 can control vibration of the dust removal unit 300. The vibration control unit 114 can control the vibration of the dust removal unit 300 in accordance with vibration control commands from the UAV control unit 30.

The control unit 110 can be configured from a microprocessor such as a CPU or MPU, a microcontroller such as an MCU, or the like. The memory 130 can be a computer readable recording medium and can include at least one of: SRAM; DRAM; EPROM; EEPROM; and flash memory such as USB memory. The imaging control unit 112 and the vibration control unit 114 can be configured from one or more of microcontrollers. The imaging control unit 112 and the vibration control unit 114 can be respectively configured from separate microcontrollers. The memory 130 can be provided inside the housing of the imaging device 100. The memory 130 can be provided so as to be removable from the housing of the imaging device 100.

The image sensor 120 can generate image data of optical images formed via the lenses 210 and can output this data to the imaging control unit 112. The image sensor 120 can be configured from CCD or CMOS. The imaging control unit 112 can store image data output from the image sensor 120 in the memory 130. The imaging control unit 112 can output image data to the memory 32 via the UAV control unit 30 and then store the data therein. The imaging control unit 112 can control the lens device 200 in accordance with operation instructions for the lens device 200 that are provided from the UAV control unit 30.

The dust removal unit 300 can have an optical member 302 (optical element), and an electromechanical conversion element 303 (electromechanical converter). The optical member 302 can be disposed to the front of the image sensor 120. The optical member 302 can be configured from a transparency material such as glass or quartz. The optical member 302 can be configured in a plate-like shape. "Transparency" means having the property of transmitting light. The transparency material should be a material that has a property in which the transmittance of light in the visible light range (350 nm to 780 nm) exceeds at least 50%. The electromechanical conversion element 303 can be attached to the optical member 302. The electromechanical conversion element 303 can convert electrical energy into mechanical energy. The electromechanical conversion element 303 can be a piezoelectric element, for example.

Figure 3:
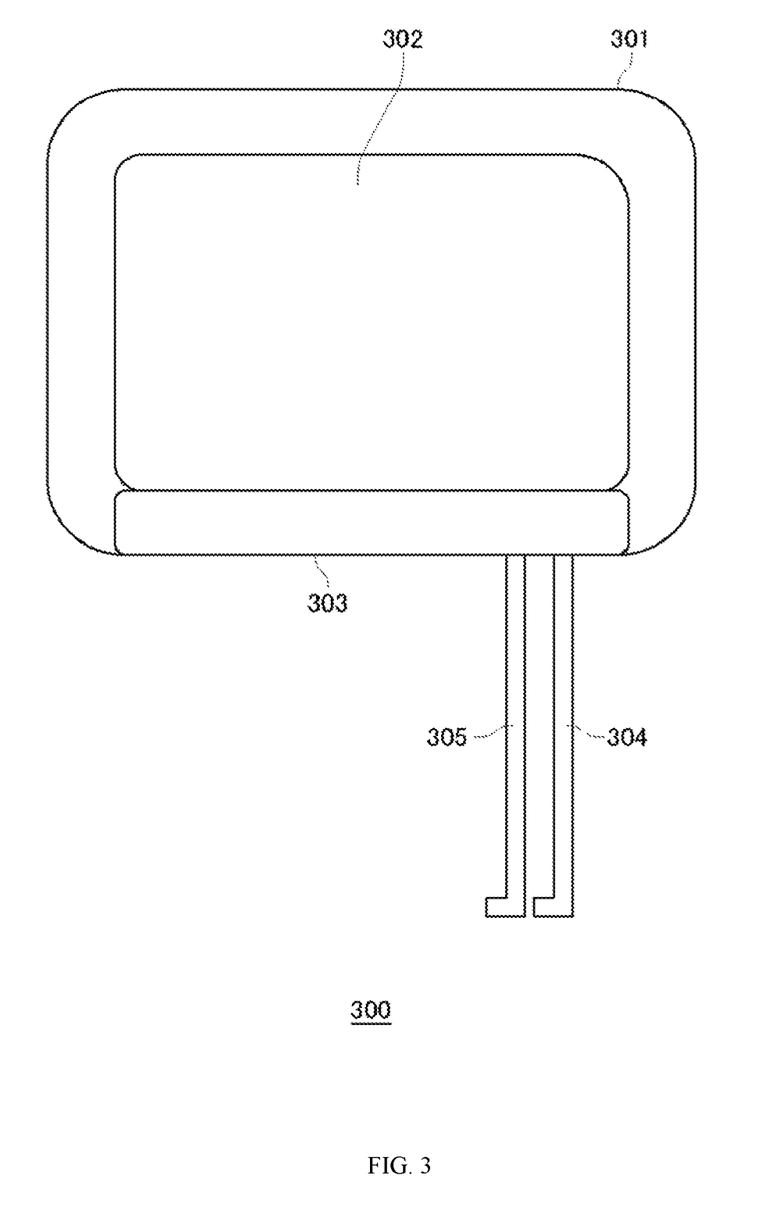
FIG. 3 is a diagram illustrating one example of a configuration of a dust removal unit.

FIG. 3 illustrates one example of the configuration of the dust removal unit 300. The dust removal unit 300 can include: a frame 301; the optical member 302; the electromechanical conversion element 303; wiring 304; and wiring 305. The frame 301 can support the optical member 302. The electromechanical conversion element 303 can be attached to the optical member 302 via the frame 301. The electromechanical conversion element 303 can be electrically coupled to the vibration control unit 114 via the wiring 304 and the wiring 305. A control signal provided by the vibration control unit 114 can be transmitted to the electromechanical conversion element 303 via the wiring 304 and the wiring 305. The electromechanical conversion element 303 can vibrate in accordance with the control signal and can cause the optical member 302 to vibrate. Dust or the like adhering to the optical member 302 can be removed as a result of the optical member 302 oscillating.

Figure 4:
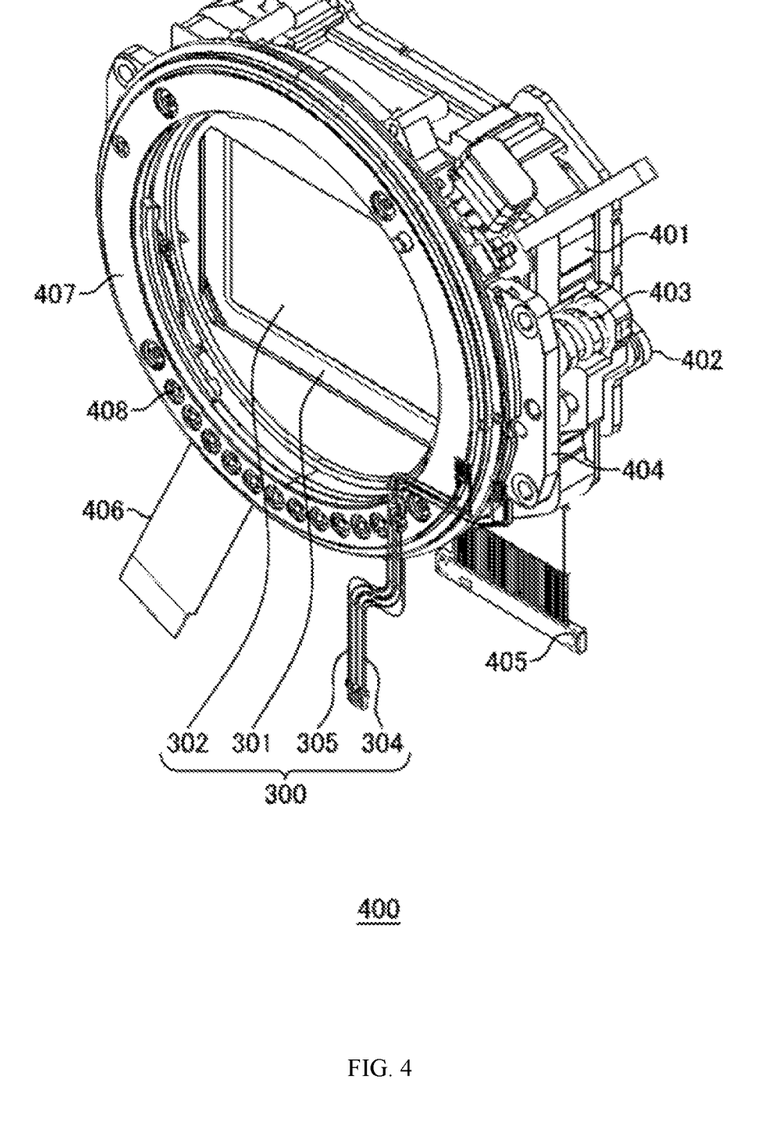
FIG. 4 is a diagram illustrating an exterior of one example of an imaging mechanism that is a portion of an imaging device.

FIG. 4 illustrates an exterior of one example of an imaging mechanism 400 that is a portion of the imaging device 100. The imaging mechanism 400 can include: a support substrate 401; a heat sink 402; a lens mount 407; and the dust removal unit 300. The support substrate 401 can be provided on one surface of the heat sink 402. The support substrate 401 can support the image sensor 120. The optical member 302 can be provided on the surface of the support substrate 401 opposite of the heat sink 402 with the frame 301 being interposed therebetween. The lens mount 407 can be provided on the surface of the frame 301 opposite of the support substrate 401. The lens mount 407 can have a support body 404 at the periphery thereof. The support body 404 can be integrally configured to the lens mount 407. The support body 404 can be fixed to the support substrate 401 via a spring 403. The spring 403 can modulate the influence of the support substrate 401. The support substrate 401 can include wiring 405. The support substrate 401 can be coupled to the control unit 110 via the wiring 405. The lens mount 407 can include at least one electrical contact 408, and wiring 406. The electrical contact 408 can be coupled to the control unit 110 via the wiring 406. Lens control instructions can be transmitted from the imaging device 100 to the lens device 200 via the electrical contact 408.

In the imaging device 100 configured in the above-described manner, dust or the like adhering to the optical member 302 can be removed by causing the optical member 302 to vibrate. The vibration properties of the optical member 302 can change according to the conditions of the surrounding environment, such as temperature and air pressure. The UAV 10 equipped with the imaging device 100 can fly through the sky, where the surrounding environment can change significantly, for example. When the dust removal unit 300 is used in such a surrounding environment, there can be a possibility that the vibration properties of the optical member 302 will fluctuate, the optical member 302 will not adequately vibrate, and dust or the like adhering to the optical member 302 will not be removed.

The vibration control unit 114 can control the vibration frequency of the optical member 302. The vibration control unit 114 can provide a control signal to the electromechanical conversion element 303, thereby controlling the vibration of the electromechanical conversion element 303. The vibration control unit 114 can provide the control signal, which can be a voltage that has a predetermined vibration frequency and can have an amplitude of a predetermined size, to the electromechanical conversion element 303. The electromechanical conversion element 303 can cause the optical member 302 to vibrate in accordance with the control signal from the vibration control unit 114.

The vibration control unit 114 can provide a control signal to the electromechanical conversion element 303 with a voltage amplitude of a first size when a voltage frequency is a first frequency. The vibration control unit 114 can provide a control signal to the electromechanical conversion element 303 with a voltage amplitude of a second size that is smaller than the first size when the frequency of the voltage is of a second frequency that is closer to the resonant frequency of the optical member 302 than the first frequency. The vibration control unit 114 can provide to the electromechanical conversion element 303 a control signal in which the voltage amplitude becomes larger as the frequency of the voltage moves away from the second frequency. The second frequency can be the resonant frequency of the optical member 302.

The vibration control unit 114 can provide a control signal to the electromechanical conversion element in which the voltage amplitude gradually changes from the first size to the second size in response to the frequency of the voltage gradually changing from the first frequency to the second frequency. The first frequency can be smaller than the second frequency. The second frequency can be the resonant frequency. The vibration control unit 114 can provide a control signal to the electromechanical conversion element in which, after the voltage amplitude has gradually changed from the first size to the second size in response to the frequency of the voltage gradually changing from the first frequency to the second frequency, the voltage amplitude gradually changes from the second size to a third size, which is larger than the second size, in response to the frequency of the voltage gradually changing from the second frequency to a third frequency, which is larger than the second frequency.

The vibration control unit 114 can provide a control signal to the electromechanical conversion element 303 after the voltage amplitude has gradually changed from the second size to the third size. The control signal is provided in response to the frequency of the voltage gradually changing from the second frequency to the third frequency. The voltage amplitude gradually changes from the third size to the second size in response to the frequency of the voltage gradually changing from the third frequency to the second frequency. Furthermore, the vibration control unit 114 can provide a control signal to the electromechanical conversion element 303 in which the voltage amplitude gradually changes from the second size to the first size in response to the frequency of the voltage gradually changing from the second frequency to the first frequency. For example, the vibration control unit 114 can function as a voltage generator that is able to output a voltage pulse (a square wave voltage) from the first frequency (10 kHz, for example) to the third frequency (50 kHz, for example).

The vibration control unit 114 can repeatedly provide the control signal to the electromechanical conversion element 303 a predetermined number of times. The vibration control unit 114 can provide to the electromechanical conversion element 303 a control signal in which the frequency of the voltage and the size of the voltage amplitude gradually change after a predetermined amount of time has elapsed. The vibration control unit 114 can provide to the electromechanical conversion element 303 a control signal in which the frequency of the voltage gradually changes by a predetermined frequency and the size of the voltage amplitude gradually changes by a predetermined size.

The vibration control unit 114 can provide to the electromechanical conversion element 303 a control signal in which the voltage of the control signal is at a minimum when the frequency of the voltage of the control signal is close to the resonant frequency of the optical member 302. The vibration control unit 114 can provide to the electromechanical conversion element 303 a control signal of the first frequency in which the size of the voltage amplitude is 80 V, for example. Thereafter, the vibration control unit 114 can provide to the electromechanical conversion element 303 a control signal in which the size of the voltage amplitude becomes smaller as the frequency approaches the resonant frequency of the optical member 302. Furthermore, the vibration control unit 114 can provide to the electromechanical conversion element 303 a control signal in which the size of the voltage amplitude increases as the frequency moves away from the resonant frequency of the optical member 302. The size of the voltage amplitude of the control signal provided to the electromechanical conversion element 303 can be smallest near the resonant frequency of the optical member 302.

The vibration control unit 114 can modify the size of the voltage amplitude of the control signal in accordance with the frequency of the control signal. When the frequency of the control signal is near the resonant frequency of the optical member 302, the vibration amplitude of the optical member 302 increases, even if the size of the voltage amplitude of the control signal is small. Meanwhile, when the frequency of the control signal moves away from the resonant frequency of the optical member 302, the vibration amplitude of the optical member 302 can become smaller if the size of the voltage amplitude of the control signal is the same as near the resonant frequency. By increasing the size of the voltage amplitude of the control signal so as to be larger than near the resonant frequency, it is possible to increase the vibration amplitude of the optical member 302. As a result, variations in the vibration amplitude of the optical member 302, which occur as a result of differences in the size of the frequency provided to the electromechanical conversion element 303, are suppressed. Thus, it is possible to prevent a situation in which the optical member 302 does not sufficiently vibrate and dust or the like adhering to the optical member 302 is not removed as a result of differences in the size of the frequency provided to the electromechanical conversion element 303.

In addition, the vibration control unit 114, after causing the vibration frequency of the optical member 302 to gradually change from the first frequency to the third frequency, can cause the vibration frequency to gradually change from the third frequency to the first frequency. As a result, it is possible to mitigate the influence of fluctuations in the vibration properties of the optical member 302 that can occur when the dust removal unit 300 is used when there are large fluctuations in the surrounding environment. Thus, even when the dust removal unit 300 is used when there are large fluctuations in the surrounding environment, it is possible to cause the optical member 302 to efficiently vibrate. As a result, it is possible to prevent a situation in which the optical member 302 does not sufficiently vibrate and dust or the like adhering to the optical member 302 is not removed. For example, the vibration control unit 114 can detect the resonant frequency of the optical member 302 that changes with the surrounding environment. The vibration control unit need not control the control signal based on this detected resonant frequency. Thus, it is possible to prevent the configuration of the dust removal unit 300 from becoming complex.

Figure 5:
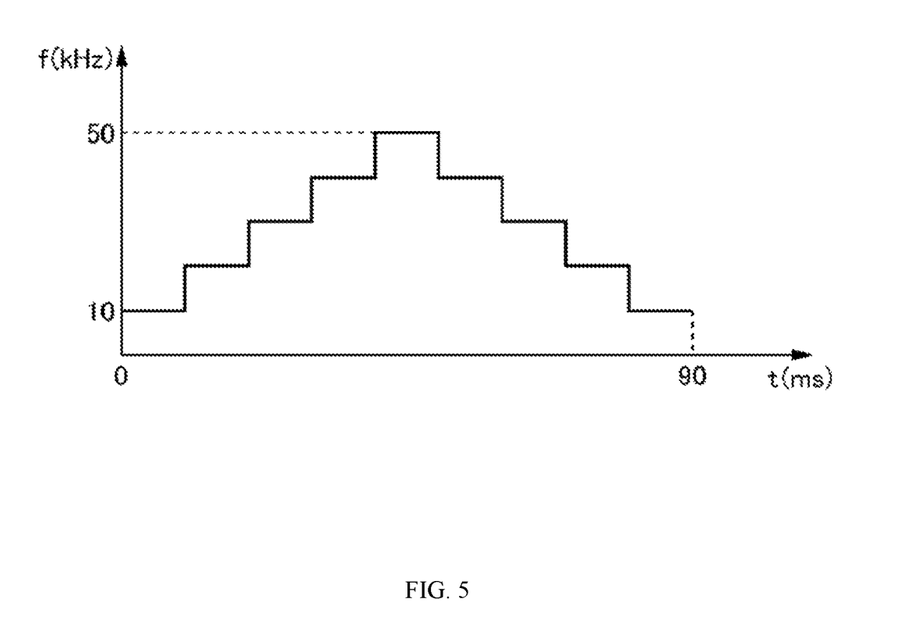
FIG. 5 is a diagram illustrating one example of a relationship between time and the vibration frequency of a control signal.

FIG. 5 illustrates one example of a relationship between time and the vibration frequency of the control signal provided to the electromechanical conversion element 303. The vibration control unit 114 can provide to the electromechanical conversion element 303 a control signal in which the vibration frequency increases by 10 kHz every 10 ms to 50 kHz, and the vibration frequency thereafter decreases by 10 kHz every 10 ms to 10 kHz, for example.

Figure 6:
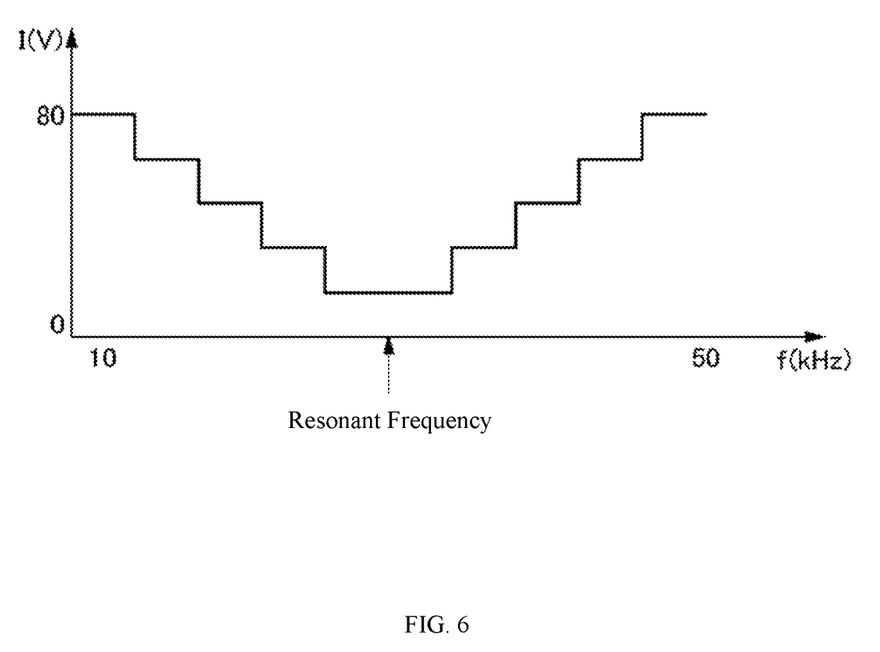
FIG. 6 is a diagram illustrating one example of a relationship between time and the size of the voltage amplitude of a control signal.

FIG. 6 illustrates one example of a relationship between time and the size of the voltage amplitude of the control signal provided to the electromechanical conversion element 303. In this example, the resonant frequency of the optical member 302 is near 25 kHz. The vibration control unit 114 can gradually decrease the voltage of the control signal from a maximum voltage of 80 V to a minimum voltage of 10 V while causing the frequency of the control signal to gradually increase from 10 kHz to 25 kHz. Next, the vibration control unit 114 can gradually increase the voltage of the control signal from the minimum voltage of 10 V to the maximum voltage of 80 V while causing the frequency of the control signal to gradually increase from 25 kHz to 50 kHz. Furthermore, the vibration control unit 114 can gradually decrease the voltage of the control signal from the maximum voltage of 80 V to the minimum voltage of 10 V while causing the frequency of the control signal to gradually decrease from 50 kHz to 25 kHz. Next, the vibration control unit 114 can gradually increase the voltage of the control signal from the minimum voltage of 10 V to the maximum voltage of 80 V while causing the frequency of the control signal to gradually decrease from 25 kHz to 10 kHz. In this manner, by changing the voltage of the control signal in accordance with the size of the frequency of the control signal, it is possible to prevent variations in the vibration amplitude of the optical member 302.

Figure 7:
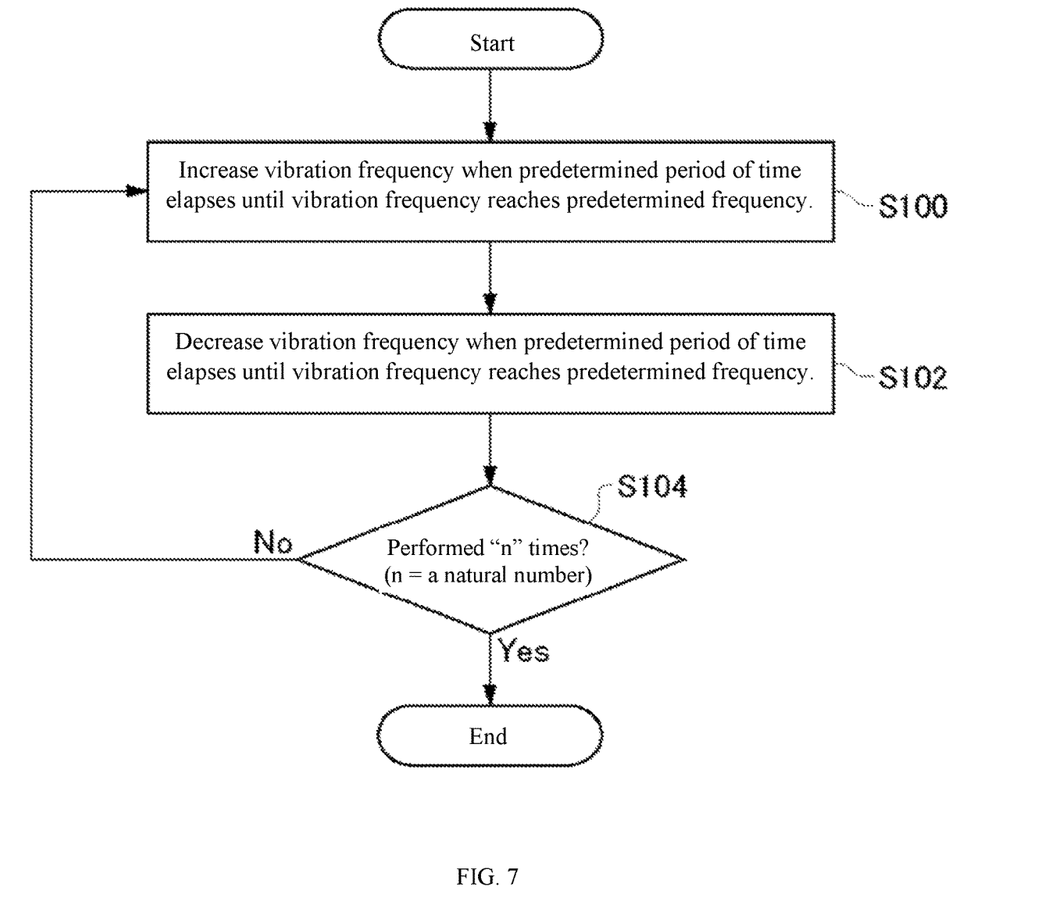
FIG. 7 is a flowchart illustrating one example of a procedure for vibration control of an optical member.

FIG. 7 is a flowchart that illustrates one example of a procedure for vibration control of the optical member 302. When a predetermined period of time elapses, the vibration control unit 114 can provide to the electromechanical conversion element 303 a control signal in which the vibration frequency increases to a predetermined frequency (S100). Next, the vibration control unit 114 can provide to the electromechanical conversion element 303 a control signal in which the vibration frequency decreases at a predetermined frequency (S102). While executing Step S100 to Step S102, the vibration control unit 114 can adjust the voltage of the control signal such that the size of the width of the voltage of the control signal is at a minimum near the resonant frequency of the optical member 302. The vibration control unit 114 can determine whether or not the processing of Step S100 and Step S102 has been carried out a predetermined "n" (with "n" being a natural number) number of times (Step S104). The vibration control unit 114 can repeat the processing of Step S100 and Step S102 until the steps have been carried out the predetermined "n" number of times.

Figure 8:
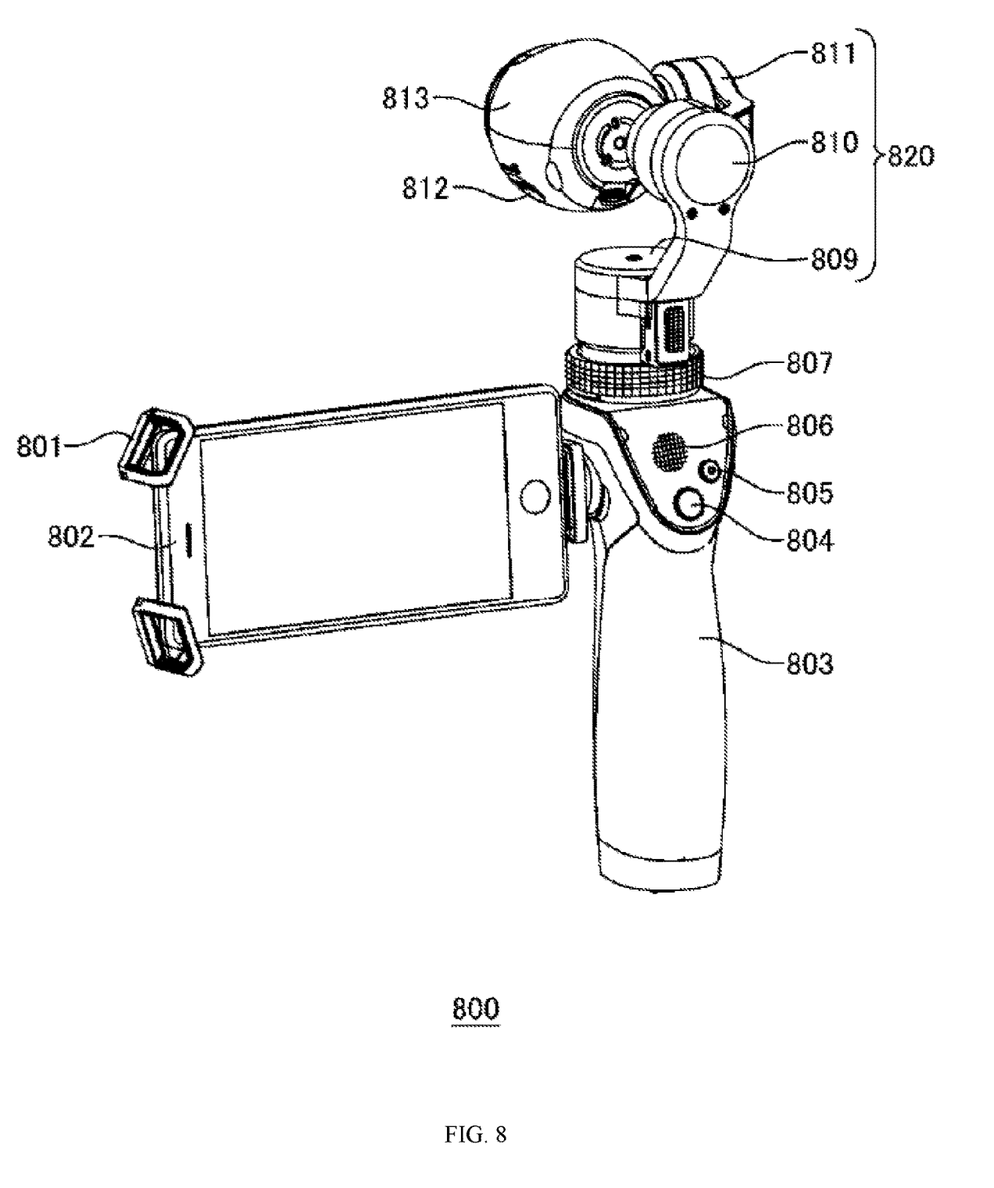
FIG. 8 is an external perspective view illustrating one example of a stabilizer.

FIG. 8 is an external perspective view that illustrates one example of a stabilizer 800. A UAV 10 equipped with an imaging device 100 that had a dust removal unit 300 was described above. However, the imaging device 100 having the dust removal unit 300 does not need to be mounted in the UAV 10. The imaging device 100 having the dust removal unit 300 can be mounted in a movable object other than the UAV 10. A camera unit 813 (camera) mounted in the stabilizer 800 can include the dust removal unit 300, for example.

The stabilizer 800 can include: the camera unit 813; a gimbal 820; and a handle 803. The gimbal 820 can rotatably support the camera unit 813. The gimbal 820 can have a pan axis 809, a roll axis 810, and a tilt axis 811. The gimbal 820 can rotatably support the camera unit 813 about the pan axis 809, the roll axis 810, and the tilt axis 811. The gimbal 820 is an example of a carrier. The camera unit 813 is an example of an imaging device. The camera unit 813 can include the dust removal unit 300 in the interior thereof. The camera unit 813 can have a slot 812 for inserting memory. The gimbal 820 can be fixed to the handle 803 via a holder 807.

The handle 803 can have various types of buttons for operating the gimbal 820 and the camera unit 813. The handle 803 can include: a shutter button 804; a record button 805; and an operation button 806. By pressing the shutter button 804, it is possible to record still images via the camera unit 813. By pressing the record button 805, it is possible to record moving images via the camera unit 813.

A device holder 801 can be fixed to the handle 803. The device holder 801 can hold a mobile device 802 such as a smartphone. The mobile device 802 can be communicatively coupled to the stabilizer 800 via a wireless network such as WiFi. As a result, it is possible to cause images captured via the camera unit 813 to be displayed on the screen of the mobile device 802.

According to the stabilizer 800 configured in the above-described manner, it is possible to prevent a situation in which variations occur in the vibration of the optical member 302 due to fluctuations in the vibration frequency of the optical member 302 that result in dust or the like adhering to the optical member 302 not being removed. In addition, even when the stabilizer 800 is used in an area where there are large fluctuations in the surrounding environment, such as in the mountains or in the Arctic, it is possible to prevent the situation in which the optical member 302 does not adequately vibrate and dust or the like adhering to the optical member 302 is not removed.

Figure 9:
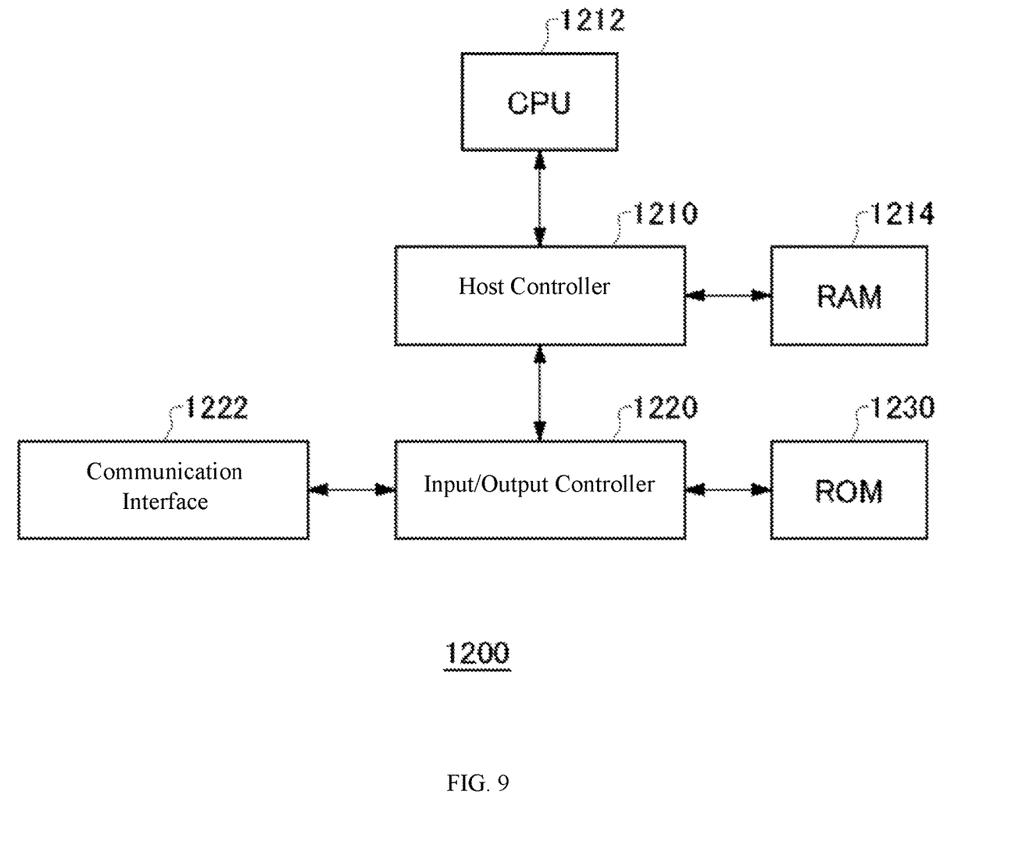
FIG. 9 is a diagram illustrating one example of a hardware configuration.

FIG. 9 illustrates one example of a computer 1200 in which a plurality of aspects of the present disclosure can be completely or partially realized. Programs installed in the computer 1200 can cause the computer 1200 to function as operations associated with a device according to an embodiment of the present disclosure or as one or more of "units" in such a device. Alternatively, the programs can cause the computer 1200 to execute the operations or the one or plurality of "units." The programs can cause the computer 1200 to execute a process according to an embodiment of the present disclosure or the steps of such a process. Such programs can be executed via a CPU 1212 in order to cause the computer 1200 to execute specific operations associated with some or all of the blocks in the block diagrams and the flowcharts described in the present specification.

The computer 1200 according to the present embodiment can include the CPU 1212 and RAM 1214, and these elements can be coupled to each other via a host controller 1210. The computer 1200 further can include a communication interface 1222 and an input/output unit, and these elements can be coupled to the host controller 1210 via an input/output controller 1220. The computer 1200 further can include ROM 1230. The CPU 1212 can operate in accordance with programs stored within the ROM 1230 and RAM 1214, and thereby can control the various units.

The communication interface 1222 can communicate with other electronic devices via a network. A hard disk drive can store programs and data used by the CPU 1212 in the computer 1200. The ROM 1230 can store therein boot programs and the like executed by the computer 1200 when the computer becomes activated and/or programs that are dependent on the hardware of the computer 1200. The programs can be provided via a network or a computer readable medium such as CD-ROM, USB memory, or an IC card. The programs can be installed in the ROM 1230 or RAM 1214, which are examples of a computer readable medium, and can be executed by the CPU 1212. The information processing described within these programs can be read by the computer 1200, and can link the programs with the various types of hardware resources mentioned above. A device or method can be configured by realizing the operation or processing of information based on the usage of the computer 1200.

For example, when communication is carried out between the computer 1200 and an external device, the CPU 1212 can execute communication programs that have been loaded onto the RAM 1214 and can then instruct the communication interface 1222 to perform communication processing in accordance with the processing specified in the communication programs. The communication interface 1222, under the control of the CPU 1212, can read transmission data stored in a transmit buffer processing region provided within a recording medium such as the RAM 1214 or USB memory. The communication interface 1222 then can send the read transmission data to the network, or can write transmission data received from the network in a receive buffer processing region or the like provided in the recording medium.

In addition, the CPU 1212 can be configured such that an entire database, necessary portions of the database, or files stored in an external recording medium such as USB memory or the like, are read by the RAM 1214, and the CPU 1212 can execute various types of processing on the data in the RAM 1214. Next, the CPU 1212 can write the processed data back onto the external recording medium.

Various types of information such as various types of programs, data, tables, and databases can be stored on the recording medium and can receive various types of information processing. The CPU 1212 can perform various types of processing and various types of operations, which are described throughout the present specification and are specified by the instruction sequences of the programs, on the data read from the RAM 1214. These types of processing can include: information processing, conditional judgement, conditional branching, unconditional branching, information retrieval/substitution, and the like. The CPU 1212 then can write the results back onto the RAM 1214. In addition, the CPU 1212 can retrieve information from files, a database, or the like within the recording medium. For example, when a plurality of entries each having a characteristic value of a first characteristic associated with a characteristic value of a second characteristic are stored within the recording medium, the CPU 1212 can do the following: retrieve from among the plurality of entries an entry that matches conditions specified by the characteristic value of the first characteristic; read the characteristic value of the second characteristic stored within the entry; and thereby obtain the characteristic value of the second characteristic that is associated with the first characteristic that satisfies the predetermined conditions.

The above-described programs or a software module can be stored in the computer 1200 or on a computer readable medium near the computer 1200. In addition, a recording medium such as RAM or a hard disk provided within a server system that is coupled to a dedicated communication network or the internet can be used as the computer readable medium, whereby the programs are provided to the computer 1200 via the network.

The present disclosure is described using embodiments, but the technical scope of the disclosure is not limited to the scope in the above embodiments. It should be clear to a person skilled in the art that the above embodiments are susceptible to various modifications or improvements. It should also be clear from the scope of the claims that forms having such modifications or improvements can be included in the technical scope of the present disclosure.

The order of each process in the operations, procedures, steps, stages, and the like of the devices, systems, programs, and methods in the scope of the claims, specification, and drawings is not specifically disclosed using "beforehand", "in advance", and the like, and any order is possible as long as a postprocess does not use the output of a preprocess. Even if "first", "next", and the like are used for convenience in describing the flow of operations in the scope of the claims, specification, and drawings, it is not meant that the operations must be executed in this order.

DESCRIPTION OF REFERENCE NUMERALS

10 UAV
20 UAV body
30 UAV control unit
32, 130 Memory
34 Communication interface
40 Propulsion unit
50 Gimbal
60 Imaging device
100 Imaging device
110 Control unit
112 Imaging control unit
114 Vibration control unit
120 Image sensor
200 Lens device
210 Lens
212 Lens movement mechanism
220 Lens control unit
300 Dust removal unit
301 Frame
302 Optical member
303 Electromechanical conversion element
304, 305, 405, 406 Wiring
400 Imaging mechanism
401 Support substrate
402 Heat sink
404 Support body
407 Lens mount
408 Electrical contact
800 Stabilizer
801 Device holder
802 Mobile device
803 Handle
804 Shutter button
805 Record button
806 Operation button
807 Holder
809 Pan axis
810 Roll axis
811 Tilt axis
812 Slot
813 Camera unit
820 Gimbal

What is claimed is:

1. An imaging device, comprising:
    an image sensor;
    an optical element arranged in front of the image sensor;
    an electromechanical converter attached to the optical element; and
    a controller configured to provide a control signal to the electromechanical converter to control a vibration of the electromechanical converter;
    wherein:
        an amplitude of the control signal has a first amplitude value when a frequency of the control signal has a first frequency value; and
        the amplitude of the control signal has a second amplitude value smaller than the first amplitude value when the frequency of the control signal has a second frequency value that is closer to a resonant frequency of the optical member than the first frequency value.

2. The imaging device of claim 1, wherein the amplitude of the control signal is positively correlated to a difference between the frequency of the control signal and the second frequency value.

3. The imaging device of claim 1, wherein the second frequency value equals the resonant frequency of the optical element.

4. The imaging device of claim 1, wherein the controller is further configured to vary the amplitude of the control signal gradually from the first amplitude value to the second amplitude value in response to the frequency of the control signal gradually changing from the first frequency value to the second frequency value.

5. The imaging device of claim 4, wherein:
    the first frequency value is smaller than the second frequency value;
    the second frequency value equals the resonant frequency; and
    the controller is further configured to, after the amplitude of the control signal gradually changes from the first amplitude value to the second amplitude value in response to the frequency of the control signal gradually changing from the first frequency value to the second frequency value, vary the amplitude of the control signal gradually from the second amplitude value to a third amplitude value that is larger than the second amplitude value in response to the frequency of the control signal gradually changing from the second frequency value to a third frequency value that is larger than the second frequency value.

6. The imaging device of claim 5, wherein the controller is further configured to, after the amplitude of the control signal gradually changes from the second amplitude value to the third amplitude value in response to the frequency of the control signal gradually changing from the second frequency value to the third frequency value:

vary the amplitude of the control signal gradually from the third amplitude value to the second amplitude value in response to the frequency of the control signal gradually changing from the third frequency value to the second frequency value; and vary the amplitude of the control signal gradually from the second amplitude value to the first amplitude value in response to the frequency of the control signal gradually changing from the second frequency value to the first frequency value.

7. The imaging device of claim 6, wherein the controller is further configured to repeatedly provide the control signal to the electromechanical converter for a predetermined number of times.

8. The imaging device of claim 1, wherein the controller is further configured to vary the frequency and the amplitude of the control signal gradually for a predetermined amount of time elapse.

9. The imaging device of claim 1, wherein the controller is further configured to gradually vary the frequency of the control signal by a predetermined frequency range and gradually vary the amplitude of the control signal by a predetermined amplitude range.

10. An imaging system, comprising:
the imaging device of claim 2; and
a carrier that supports the imaging device.

11. An imaging system, comprising:
the imaging device of claim 3; and
a carrier that supports the imaging device.

12. An imaging system, comprising:
the imaging device of claim 4; and
a carrier that supports the imaging device.

13. An imaging system, comprising:
the imaging device of claim 5; and
a carrier that supports the imaging device.

14. An imaging system, comprising:
the imaging device of claim 6; and
a carrier that supports the imaging device.

15. An imaging system, comprising:
the imaging device of claim 7; and
a carrier that supports the imaging device.

16. An imaging system, comprising:
the imaging device of claim 8; and
a carrier that supports the imaging device.

17. An imaging system, comprising:
the imaging device of claim 1; and
a carrier that supports the imaging device.

18. A movable object comprises the imaging system of claim 17.

19. The movable object of claim 18, wherein the movable object is an unmanned aerial vehicle.

20. The imaging system of claim 17, further comprising:
a handle attached to the carrier.

* * * * *